United States Patent
Shtivelman

(10) Patent No.: US 6,535,492 B2
(45) Date of Patent: *Mar. 18, 2003

(54) METHOD AND APPARATUS FOR ASSIGNING AGENT-LED CHAT SESSIONS HOSTED BY A COMMUNICATION CENTER TO AVAILABLE AGENTS BASED ON MESSAGE LOAD AND AGENT SKILL-SET

(75) Inventor: Yuri Shtivelman, San Francisco, CA (US)

(73) Assignee: Genesys Telecommunications Laboratories, Inc., Daly City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/452,541

(22) Filed: Dec. 1, 1999

(65) Prior Publication Data

US 2002/0060988 A1 May 23, 2002

(51) Int. Cl.[7] .................. H04L 12/16; H04L 12/28; H04M 3/00; H04M 5/00
(52) U.S. Cl. .................... 370/270; 379/265.05
(58) Field of Search .................. 370/270; 379/309, 379/265, 266, 201, 93.12, 265.01, 265.02, 265.05, 265.06, 265.07, 266.01, 266.02, 266.03, 266.04, 269.09; 709/227, 228, 229, 204, 205, 206, 207

(56) References Cited

U.S. PATENT DOCUMENTS 5,335,268 A * 8/1994 Kelly, Jr. et al. .......... 379/112
5,828,747 A * 10/1998 Fisher et al. ............. 379/309
5,958,014 A * 9/1999 Cave ...................... 709/229
5,978,467 A * 11/1999 Walker et al. ............ 379/266
5,999,965 A * 12/1999 Kelly ...................... 709/202

OTHER PUBLICATIONS

Festa, Paul. "Vignette Updates StoryServer Platform." CNET News.com, Sep. 16, 1997.*
McGlasson, Chris. "Net Connection's Weekly Update." Netxn.com, Apr. 26, 1999.*
Labriola, Don. "Hard Drive: Western Digital Caviar Series." ZDnet.com, Dec. 16, 1998.*

* cited by examiner

Primary Examiner—Seema S. Rao
Assistant Examiner—Kevin C. Harper
(74) Attorney, Agent, or Firm—Donald R. Boys; Central Coast Patent Agency, Inc.

(57) ABSTRACT

In a communication center system wherein agents participate in and host communication sessions, a session management system has a data repository storing parameters regarding individual sessions in progress in the communication center system and agent parameters including one or both of minimum and maximum load capabilities for individual agents. A management software executes on a server associated with the communication center system, and calculates agent load level over chat sessions hosted by an individual agent, compares the calculated load level with one or both of minimum and maximum load for said agent, and adjusts agent assignment to sessions accordingly. In the case where agents are overloaded, additional agents are assigned to open sessions, and in the case where agents are underutilized, additional sessions may be assigned to the under-utilized agents. The sessions in a preferred embodiment are chat sessions.

14 Claims, 3 Drawing Sheets

METHOD AND APPARATUS FOR ASSIGNING AGENT-LED CHAT SESSIONS HOSTED BY A COMMUNICATION CENTER TO AVAILABLE AGENTS BASED ON MESSAGE LOAD AND AGENT SKILL-SET

FIELD OF THE INVENTION

The present invention is in the field of data-packet network telephony (DNT) communication as practiced by a communication center and pertains more particularly to methods and apparatus for assigning agent-led chat sessions and other collaboration media to available agents based on message load and agent skill-set.

BACKGROUND OF THE INVENTION

In the field of DNT communications, contact events incoming to and outgoing from a DNT-capable communication-center are propagated over switched-packet data networks (SPDN) such as a wide-area-network WAN, which may include the Internet. Internet-protocol-network telephony, a sub-set of DNT, wherein voice and data calls are handled by suitable computer equipment and software is a typical and oft-used DNT implementation. Other examples include e-mail, file transfer, instant messaging, electronic facsimile, and so on.

Such DNT capability as described above provides added flexibility to agents operating within a communication center and opens up new mediums of contact for clients wishing to interact with the center. For example, agents are no longer limited to a traditional telephony systems. Agent's now have multimedia capability, and may be called multimedia agents, because they may now work with several different media types.

Multimedia agents will typically share a local-area-network (LAN) connection whereby individual agent personal-computer/video-display-units (PC/VDUs) may communicate with one another and with automated systems and switches within the communication center. In some cases, agents operate DNT-capable telephones. Communication centers employing data network capabilities may still practice computer integrated telephony (CTI) as known in the art for connection-oriented switched telephony (COST).

One IPNT medium that is practiced in DNT is the well-known chat session, which is an example of a medium in which a single agent may work with more than one client at a time. A chat session is facilitated by software operating at client stations (chat participants) and at a communications server hosted somewhere in an Internet-Protocol (IP) data network (typically the Internet). A chat session is typically hosted by a facilitator or session leader, which implements the rules and regulations governing each session. Typically a session master has controls provided that enable him or her to mute other participants, eject selected individuals from a session, direct the topics, and so on.

Recently chat-room communication has become an important tool for public interface at many DNT-capable communication centers. A single agent may effectively host more than one and up to several ongoing chat sessions simultaneously. In a situation such as this, certain parameters regarding the chat sessions themselves and the agents hosting them are typically observed. For example, it is desired that the topic or purpose of each chat session assigned to a particular agent agree in considerable degree with the hosting agent's skill-level. It is similarly desired that any agent hosting a chat session or sessions is not overloaded or under-utilized while engaged in response to communication loads in a session or sessions.

In prior art communication centers parameters are typically manually configured for each scheduled or ongoing session. This can be problematic because levels of communication loads associated with chat sessions can vary rather rapidly for any given number of participants. Moreover, limits regarding a number of participants allowed in each active chat session must be manually set by agents or an administrator on behalf of agents. Because of fluctuations regarding communications loads and number of participants logging into any chat session, and the inconvenience associated with manual adjustment of such chat session parameters, agents are often overloaded or under-utilized for significant periods of time.

What is clearly needed is an automated method and apparatus for assigning and re-assigning sessions to selected agents from a pool of available agents based on agent skill-set and current workload. Such a routing system would insure that no single agent is overloaded or under-utilized when engaging in agent-led sessions involving multiple clients, and wherein an agent may participate in more than one such session. Alternatively, or in concert with re-assignment, wait time in sessions can be adjusted.

SUMMARY OF THE INVENTION

In a preferred embodiment of the invention, in a communication center system wherein agents participate in and host interactive sessions, a session management system is provided, comprising a data repository storing parameters regarding individual sessions in progress in the communication center system and agent parameters including one or both of minimum and maximum load capabilities for individual agents; and a management software executing on a server associated with the communication center system. The system is characterized in that the management software calculates agent load level over sessions hosted by an individual agent, compares the calculated load level with one or both of minimum and maximum load for said agent, and adjusts agent loading and/or or wait time accordingly. In a preferred embodiment the agent-led sessions are chat-sessions.

In some embodiments the session management system, upon determining a first agent's load level is above maximum, assigns one or more sessions hosted by the first agent to a second agent, reducing the first agent's load. Wait time may be adjusted in addition or alternatively. In other cases the session management system, upon determining a first agent's load level is below minimum, assigns one or more addition sessions to the first agent. The system preferably operates in a call center having multiple agents interconnected on a local area network (LAN), but is applicable as well to arrangements with wide area networks, or regardless of communication connection and protocol. In determining agent loading the management software uses both traffic information and agent capability level.

In another aspect of the invention, in a communication center system wherein agents participate in and host sessions, a method for managing agent load in sessions is provided, comprising steps of (a) storing parameters regarding individual sessions in progress in the communication center system and agent parameters including one or both of minimum and maximum load capabilities for individual agents in a data repository; (b) calculating agent load level by a management software; (c) comparing calculated agent load level with stored minimum of maximum allowed agent load level, and (d) adjusting agent assignment to sessions or adjusting wait time according to the comparison in step (c).

In some cases the session management system, upon determining a first agent's load level is above maximum, assigns one or more sessions hosted by the agent to a second agent, reducing the first agent's load. Alternatively the system may adjust wait time. In other embodiments the session management system, upon determining a first agent's load level is below minimum, assigns one or more additional sessions to the first agent. The method may be practiced in a call center having multiple agents interconnected on a local area network (LAN). In practicing the method the management software preferably determines agent loading by both traffic and agent capability level.

In yet another aspect of the invention a data-network telephony (DNT)-capable communication center is provided comprising multiple agent stations having individual session-capable computer stations interconnected on a local area network (LAN); and a server connected on the LAN and executing a management software. The center is characterized in that the management software calculates agent load-level and manages agent assignments and/or wait time based on the calculated load level.

In the communication center, in some cases individual agents are assigned a maximum load level, and the management software, upon determining a first agent's load level is above maximum, assigns one or more sessions hosted by the first agent to a second agent, or adjusts wait time, reducing the first agent's load level. In other cases individual agents are assigned a minimum load level, and the management software, upon determining a first agent's load level is below minimum, assigns one or more additional sessions to the first agent. In preferred embodiments the management software determines agent loading by both traffic and agent capability level.

BRIEF DESCRIPTION OF THE DRAWING FIGURES

DESCRIPTION OF THE PREFERRED EMBODIMENTS

Figure 1:
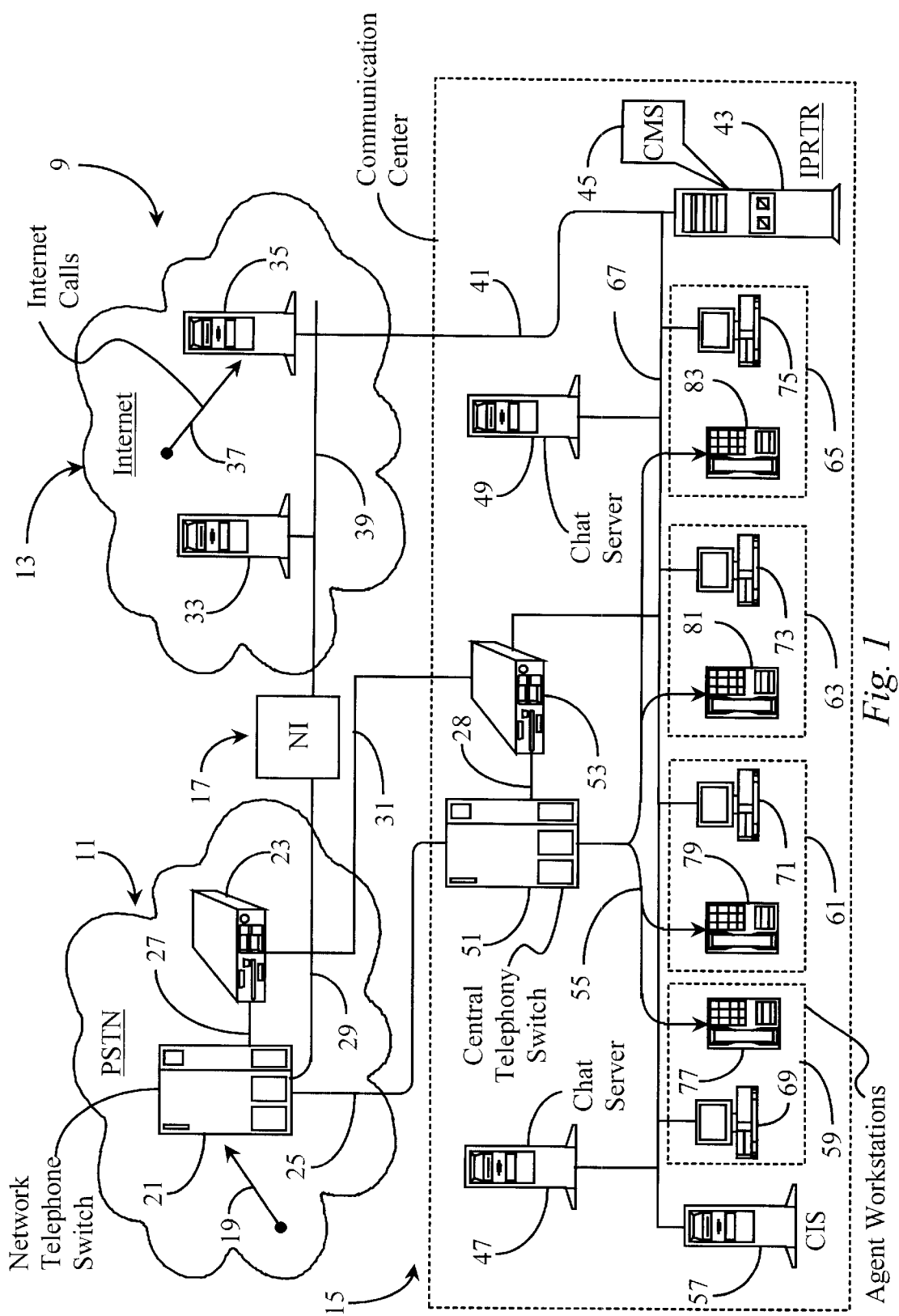
FIG. 1 is an overview of a communications network including a DNT-capable communication-center operating a chat-management software according to an embodiment of the present invention.

FIG. 1 is an overview of a communications network 9 including a DNT-capable communication-center 15 operating a chat-management software 45 according to an embodiment of the present invention. Communications network 9 comprises center 15, a public-switched-telephony-network (PSTN) 11, and the well-known Internet network represented herein by cloud 13. The inventors herein use well-known chat-sessions as a prime example of agent-led communication sessions that are amenable to practice of the present invention. The invention is not limited to chat management.

PSTN 11 may be a private telephony network instead of a public network. Internet 13 may be a private wide-area-network WAN, or a public WAN other than the Internet. The inventor chooses to illustrate PSTN 11 and Internet 13 because of the large public-access characteristic of both networks.

PSTN 11 may be assumed to contain all of the necessary equipment and connections required to process and route connection-orientated-switched-telephony (COST) events sourced from anywhere in cloud 11 to appropriate destinations. A network telephony switch 21 is provided in cloud 11 and is enhanced for computer-telephony-integration (CTI) by a CTI processor 23. Switch 21 may be a service-control-point (SCP), an automatic call distributor (ACD), or any other known type of call processing switch apparatus of system. Switch 21 is connected to CTI processor 23 by a CTI link 27.

CTI processor 23 is provided, in this example, to enable communication-center control by center 15 over call processing and switching functions performed by switch 21. Switch 21 in cloud 11 is connected to a central telephony switch 51 in communication center 15 by a telephony trunk 25. CTI processor 23 is connected to a like CTI processor 53 in communication center 15 by a data network connection 31. Processor 53 is connected to switch 51 by a CTI link 28. A vector 19 represents calls arriving at switch 21 for processing.

Internet 13 may be assumed as is known in the art to contain all of the necessary equipment and connections required to route communication events (organized into data-packets) to their appropriate destinations in Internet 13 or to such as communication center 15. Illustrated within Internet 13 are two file servers 33 and 35. File servers 33–35 are provided, hosted by center 15, and adapted to serve data to requesting clients and to act as interfacing machines to other machines and to communication center 15. In this example, server 33 may be a main company server with links to contact (live communication) pages hosted in server 35. Servers 33–35 are connected to an Internet backbone 39, which represents the numerous lines and connections comprising the Internet as known in the art. There may be one, or more than one server such as servers 33–35 maintained in Internet 13 by or on behalf of a company hosting center 15. The inventor deems that illustrating two such servers, either one of or both of which may be adapted to communicate with center 15, is sufficient for the purpose of explaining the present invention.

Server 35 is, in this example, additionally enhanced for functioning as a data router for callers 37 attempting to connect by data-network telephony (DNT) to communication center 15. Server 35 is connected to an Internet protocol router (IPRTR) 43 provided within communication center 15 by an Internet connection path 41. IPRTR 43 represents the first routing point within center 15 for DNT events 37. Path 41 may be a telephony connection line, an integrated services digital network line, or any other Internet connection facility.

A network bridge interface (NI) 17 is provided and adapted to enable PSTN calls to enter cloud 13 to be routed as DNT calls. Similarly, NI 17 may be used for converting DNT calls to PSTN calls for routing through PSTN 11 as COST events. NI 17 uses conversion protocols that are known in the art.

Communication center 15 is adapted, in this example, for receiving both COST communication events and DNT communication events. Thus center 15 is a dually-capable communication center. In some less sophisticated embodiments, center 15 may be adapted solely for DNT communication.

COST communication in center 15 in this embodiment is internally routed by CTI-enhanced switch 51, while DNT communication is internally routed by IPRTR 43. Switch 51 and IPRTR 43 represent first routing points within center 15 for communication events incoming from PSTN 11 and Internet 13 respectively.

A plurality of agent workstations, 59, 61, 63, and 65 are provided and adapted to facilitate communication and other tasks performed by agents working in center 15. In this example, each station 59–65 is provided with an agent telephone for facilitating COST communication. These are, as illustrated, telephones 77, 79, 81, and 83 respectively. Telephones 77–83 are connected to CTI-enhanced switch 51 by internal COST wiring 55.

Each agent workstation 59–65 is also provided with a PC/VDU for facilitating DNT communication and for performing other communication-center tasks. These are, as illustrated, PC/VDU 69, 71, 73, and 75 respectively. Each PC/VDU such as PC/VDU 69 in station 59 is connected to a LAN 67. LAN 67 is connected to IPRTR 43 and is used to carry routed DNT communication events to each of PC/VDUs 69–75. LAN 67, in this example, is adapted to operate according to transfer control protocol/Internet protocol (TCP/IP). Thus, LAN 67 is adapted to facilitate IPNT, which is described as a sub-set of DNT in the background section. IPNT communication types include such as E-mail, IP phone, instant messaging, E-commerce, IP chat, Internet file transfer, and so on. In some cases the PC/VDU and COST telephone capabilities at an agent station may be integrated in any one of several ways, allowing agents to interface with both COST and DNT events.

A customer information server (CIS) 57 is provided in this embodiment, connected to LAN 67, and accessible to agents operating at stations 59–65. CIS 57 stores information about customers of communication center 15. Such information may include account information, payment histories, personal data (address, telephone, etc.), profile information, and so on. Agents may access CIS 57 when communicating with a customer to obtain information about that customer, or enter information provided by a customer during an interaction. In some cases data from CIS server 57 is provided to agents automatically in handling communication events.

CTI processor 53 is also connected to LAN 67 as shown. In this way, information about a caller placing call 19, waiting to be routed at switch 21 in PSTN 11, may be forwarded to an agent operating at one of stations 59–65 perhaps ahead of the actual COST call. Moreover, intelligent routing routines facilitated by software (not shown), termed T-server software by the inventor and executing on server 23, may be administered from within communication center 15. T-server software is implemented at processors 23 and 53. The implementation of processors 23, 53, and separate data-network 31 enables "agent level routing" to be performed at network level. Other functions such as interactive voice response (IVR), statistical functions (STAT), call load balancing, and the like are not shown but may be assumed to be available to processor 23 at switch 21.

The detailed description of the integral elements of communication network 9 and various communication paths described above is exemplary only and serves to familiarize with the various and exemplary communication and routing capabilities of communication center 15 as a state-of-the-art facility in a background sense. However, for the purpose of the present invention, the only medium of communication that will be explicitly addressed herein after is IPNT chat communication. It is to chat communication that the present invention pertains particularly.

Two exemplary chat servers (CHS) 47 and 49 are provided and connected to LAN 67. CHS 47 and CHS 49 are utilized for facilitating multi-person chat sessions hosted by agents operating such as stations 59–65. At any given time, there may be dozens of ongoing chat sessions facilitated by servers 47 and 49. In this example, each chat sessions held in server 47 or 49 is dedicated to a specific topic pertaining to some aspect of communication-center business. If center 15 is a computer distributor, for example, then chat sessions may be about technical issues related to customer implementation and use of the computers and/or software purchased. Therefore, it will be appreciated that many different topics may be used for many separate chat sessions. It will also be appreciated that there may be more or fewer CHSs such as servers 47 and 49 represented herein. The inventor deems that illustration of two such servers is sufficient for the purpose of explaining the present invention.

IPRTR 43 maintains a continuous Internet connection to server 35 by way of path 41. Therefore, LAN-connected CHSs 47 and 49 may be considered on-line servers even though they are not directly connected to backbone 39 in Internet cloud 13. In an alternative embodiment, servers 47 and 49 may be in Internet cloud 13 instead of at the premises of center 15. The fact that they are on LAN 67 in this example represents a convenience only and is not required.

Scheduled chat sessions hosted by servers 47 and 49 are advertised in server 35 and may be accessed by anyone with the appropriate computer equipment, chat software and Internet connection. Such conventions are known in the art as well as are the methods of joining and participating in a running chat session. Therefore detailed descriptions of known chat features and capabilities will not be provided here, but are noted to be available to the inventor and the skilled artisan. It is sufficient to say that all existing features found in current chat programs are supported by the present invention including voice chat.

An instance of chat-management software (CMS) 45 is provided to execute on IPRTR 43 in this embodiment. CMS 45 is a novel and unique implementation adapted to monitor parameters associated with ongoing chat sessions hosted in servers 47 and 49. CMS 45 is further adapted to assign and re-assign agents to host ongoing chat sessions based on known agent load capacities and agent skill levels. CMS 45 may also adjust wait time in chat sessions as a way to adjust agent load. Wait time is a function of an agent's skill level in responding to communications in such sessions, and reflects the time it takes, on average, for an agent to respond to a communication. Adjusting this parameter has an effect of changing the determination of whether an agent is overloaded. In this sense, CMS 45 comprises a monitoring and reporting component and an agent routing component. CMS 45 eliminates the prior-art requirements of manually configuring hosts for chat sessions.

It is not required that CMS 45 be resident on IPRTR 43 in order to practice the present invention. For example, CMS 45 may instead be provided as monitoring and reporting instances resident in each of chat servers 47 and 49 with a main processing component provided in IPRTR 45. Providing at least a main component in IPRTR 45 allows integration with other routing routines or data that may be used in making routing decisions.

In practice of the present invention a plurality of scheduled chat sessions, hosted by servers 47 and 49 are ongoing at any given time within communication center 15. Such sessions are advertised to the public in such as server 35 in Internet 13. IPRTR 43 by way of CMS 45 assigns specific agents to host the sessions according to topic, skill level, and other communication-center rules. One agent may be assigned to more than one chat session depending on chat topic and versatility of agent skill. Interested persons navigating server 35 such as represented by vector 37 may access and join any one of the ongoing chat sessions by conventional means (clicking a chat-link, etc.).

Each ongoing chat session may have a limit set on a number of participants allowed to join one session before the session is considered full as is generally known in the art. Each session is monitored by CMS 45 with respect to a current "message load" defined in one embodiment as the frequency of incoming messages and agent responses averaged over a given time period. If an agent is hosting more than one chat session then the total message load values for each session are combined and averaged over a given time interval for all of the sessions hosted by that agent. The total results are compared to pre-set maximum and minimum limit values applied to a particular agent hosting the sessions.

If total traffic for an agent meets or exceed that agent's maximum limit value over a given time period the agent in question is considered to be at capacity or overloaded (working beyond his or her capacity). If the total traffic for an agent is at or below the agent's minimum limit value over a given time period, then the agent in question is determined to be under-utilized. CMS 45, based on results compiled for each hosting agent, assigns new or under-utilized agents to sessions taken away from overworked agents, and/or retires under-utilized agents from chat sessions, and/or adjusts wait time in sessions. CMS 45 may also re-assign retired agents to other duties. CMS 45 may also add new agents to chat-hosting duties if total maximum loads of all current hosting agents are approaching or close to maximum individual limits. More detail about CMS 45 according to embodiments of the present invention is provided below.

In some cases provision may be made for manual intervention when CMS 45 determines that an agent is overloaded or underutilized. In such a circumstance, for example, there may be no further agents to assign. Alerts may be provided for supervisory persons to make a manual decision, and the supervisor may, in response to such an alert, adjust parameters of the automatic system, such as coefficients used in determining whether an agent is overloaded or not.

Figure 2:
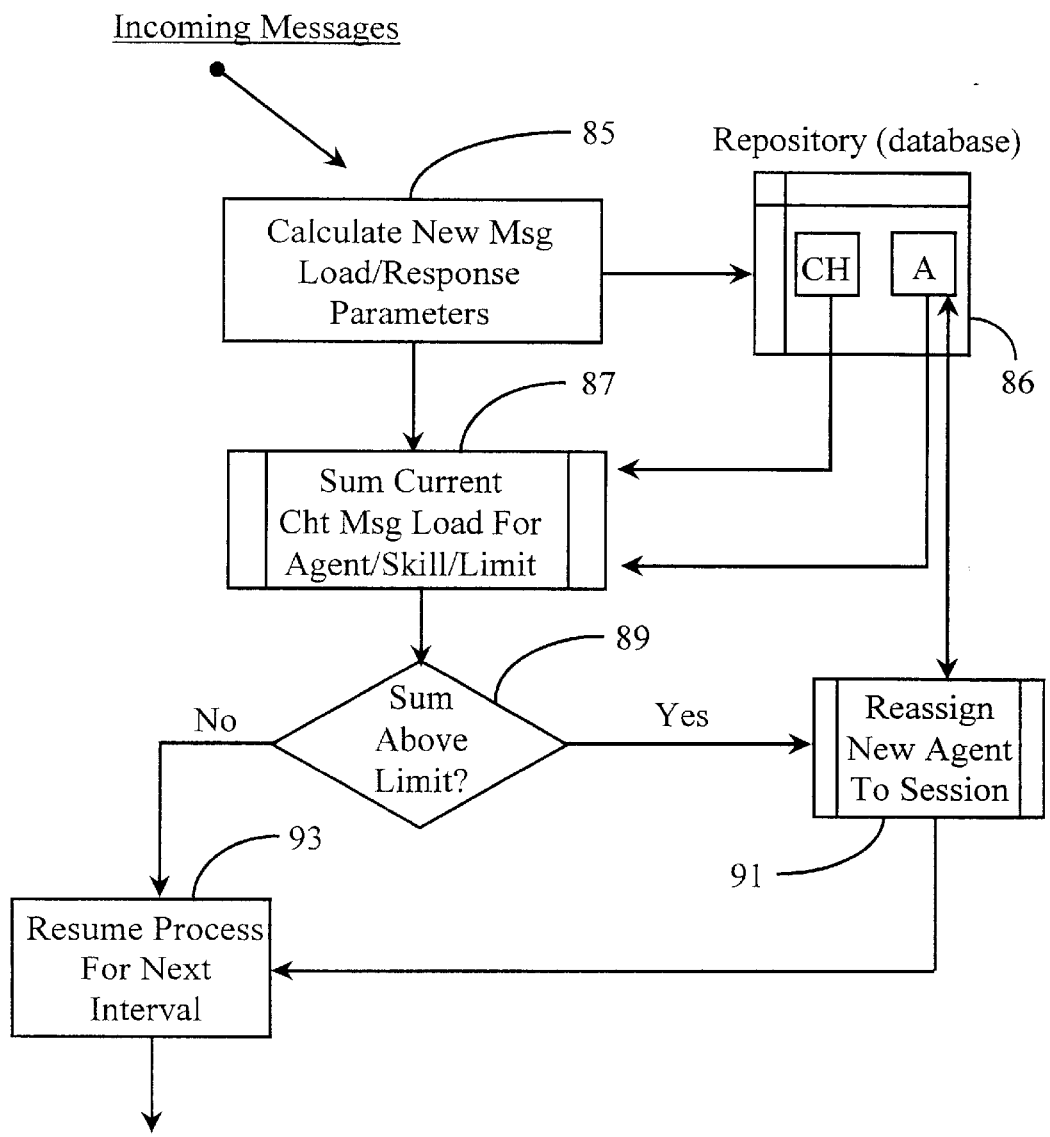
FIG. 2 is a process flowchart illustrating various automated steps associated with an exemplary automated chat-management routine configured to a maximum load limit according to an embodiment of the present invention.

FIG. 2 is a process flowchart illustrating various automated steps associated with an exemplary automated chat-management routine 45 configured to a maximum load limit according to an embodiment of the present invention.

According to a preferred embodiment of the present invention, each ongoing chat session, such as those held in servers 47 and 49 of FIG. 1, is monitored on a periodic basis for current message-load data. This process is represented herein by step 85 labeled "calculate new message load/response parameters". In this embodiment, a frequency over time value is calculated over an arbitrary time period. The sequence is repeated at periodic intervals for the duration of the session. For example, an arbitrary monitoring time-period is established for the agent's chat session or sessions. Such a time period needs to be long enough to reasonably determine what an average load might be over a more extended period of time. A period of 5 minutes is sufficient to get an idea of normal message and response flow. A periodic interval for monitoring may be set at any time period longer than the duration of monitoring. If a 30-minute interval is in effect then the session is monitored at every 30-minute interval for a 5-minute duration.

Alternatively, the time between postings can be measured, to obtain a message load factor. Other, similar methods can be used, such as the average "characters per second flow" etc. Also, the update of such parameters can happen responsive to events, rather than to a fixed time period.

In process 85, trip delays are calculated for each complete interaction (new query and agent response). This is defined in this example as the frequency with which a new query appears and is answered by an agent. If ten complete interactions are observed within the 5-minute duration, then it could be predicted that an average of 120 complete interactions would transpire per hour. At the next 30-minute interval, the process repeats enabling a more refined prediction over a longer period.

Most recent readings reflecting results for one chat session are kept in memory or loaded into a chat (CH) database that may be kept on any connected data repository as illustrated by the directional arrow connecting step 85 to an illustrated repository 86 and CH database. If an agent is hosting more than one session, then each separate session and the most recent load data generic to each session is kept. Sessions (if more than one) may be monitored simultaneously according to the same monitoring rules. In an alternate embodiment, these may be monitored according to rules individual to each session. For the purpose of convenience, it will be assumed that all ongoing sessions hosted by one agent are monitored simultaneously according to the same rules.

Also listed in the illustrated repository 86 is an agent (A) database representing agent parameters associated with the agent hosting the chat sessions listed in CH database. Such parameters include agent name, network ID, network address, current skill levels, language capabilities, and so on. Also listed in database A are the maximum and minimum load values assigned to the agent.

Many considerations may be taken into account in creating accurate and practical load limits for agents. One consideration would be typing proficiency. Another consideration may be how much "innate knowledge" an agent has about certain topics without having to use reference material. Still another consideration would be the fluency level of an agent when speaking certain foreign languages. In some cases, a load limit may be found empirically through simulated chat sessions participated in by fellow agents during training with agents posing typical questions that customers might ask under specified topics.

In process step 85, an algorithm is used to sum current chat-message loads for individual chat sessions hosted by an agent and to compare the results to an agent's preset limit parameters. In this example, a total agent-load result represents the last available readings taken from the CH database as illustrated by the directional arrow connecting the CH database to process 87. Individual session results are combined and averaged over the 5-minute duration, and if required, projected over a longer span such as an hour. Note that the results logged during a next monitoring interval may affect overall load totals. Because chat activity can fluctuate rather rapidly, processes 85 and 87 may be repeated for a number of times before a routing decision is invoked.

Along with the load figures, agent parameters from database A are taken into account in the process. Such parameters may affect which session will be re-assigned (skill level). Moreover skill level parameters are used by IPRTR 43 of FIG. 1 to "look" for a next available agent with a matching skill-set, if required, to assign to a displaced session. Agent skill levels may, in one embodiment, be equated to coefficient values that may be used when calculating agent load. For example, if there were 6 agents in a pool assigned to host chat sessions, each agent would share ⅙ of a total communication-center chat load if their skill levels were identical. However, rarely will each agent share all of the same exact skills as their counterparts. Therefore, a relative value may be assigned to each agent-skill that an agent possesses. In this regard, an agent that is fluent in Spanish (desired skill in this example) would have a lower Spanish coefficient then an agent who is mediocre in Spanish. The lower coefficient reflects less of a load for an agent engaged in a Spanish session than an agent with a higher coefficient would experience. In this way, agent skill levels may be used in an algorithm to determine, for example, which sessions and how many sessions should be assigned to a particular agent.

In this exemplary routine, it is determined in process step 89 whether or not the total message-load projected for an agent over a period of time exceeds the agent's pre-set maximum load-limit for the same period of time. If it does not, process steps 85 and 87 are resumed for all of the agent's current sessions. If, however, the projected agent-load exceeds his or her maximum limit, then one or more of the agent's sessions will be re-assigned to another agent with the same or closely matching skill level at step 91. This assumes, of course that there is an available agent working chat sessions whose limit is not challenged by his or her last readings. If all other assigned agents are near maximum limits, then a new agent may be assigned by IPRTR 43. In this case all agents may be listed in database A whether engaged in hosting chat, or assigned to other duties.

IPRTR 43 may effect reassignment by sending notification to a target agent, which tells the agent which chat session (address) to navigate to and assume control. Similarly, an outgoing agent may receive notification that a new host will be arriving to take over a particular session. Once a new agent has arrived, an outgoing agent may disengage from the target session. In one embodiment, a part-time or floating agent may be dispatched to temporarily help a hosting agent process his or her message-load such that when the total load falls back below a maximum limit the original hosting agent may resume singular control.

It will be apparent to one with skill in the art that a process flow such the one represented herein may be further broken down into many tasks and sub-tasks without departing from the spirit and scope of the present invention. Moreover, differing steps and alternate orders of steps may be assumed depending on the exact circumstances operating within a communication center such as center 15. The CMS routine represented herein may also be applied to comparing results against an agent's pre-set minimum load limit. Such a process flow is detailed below.

Figure 3:
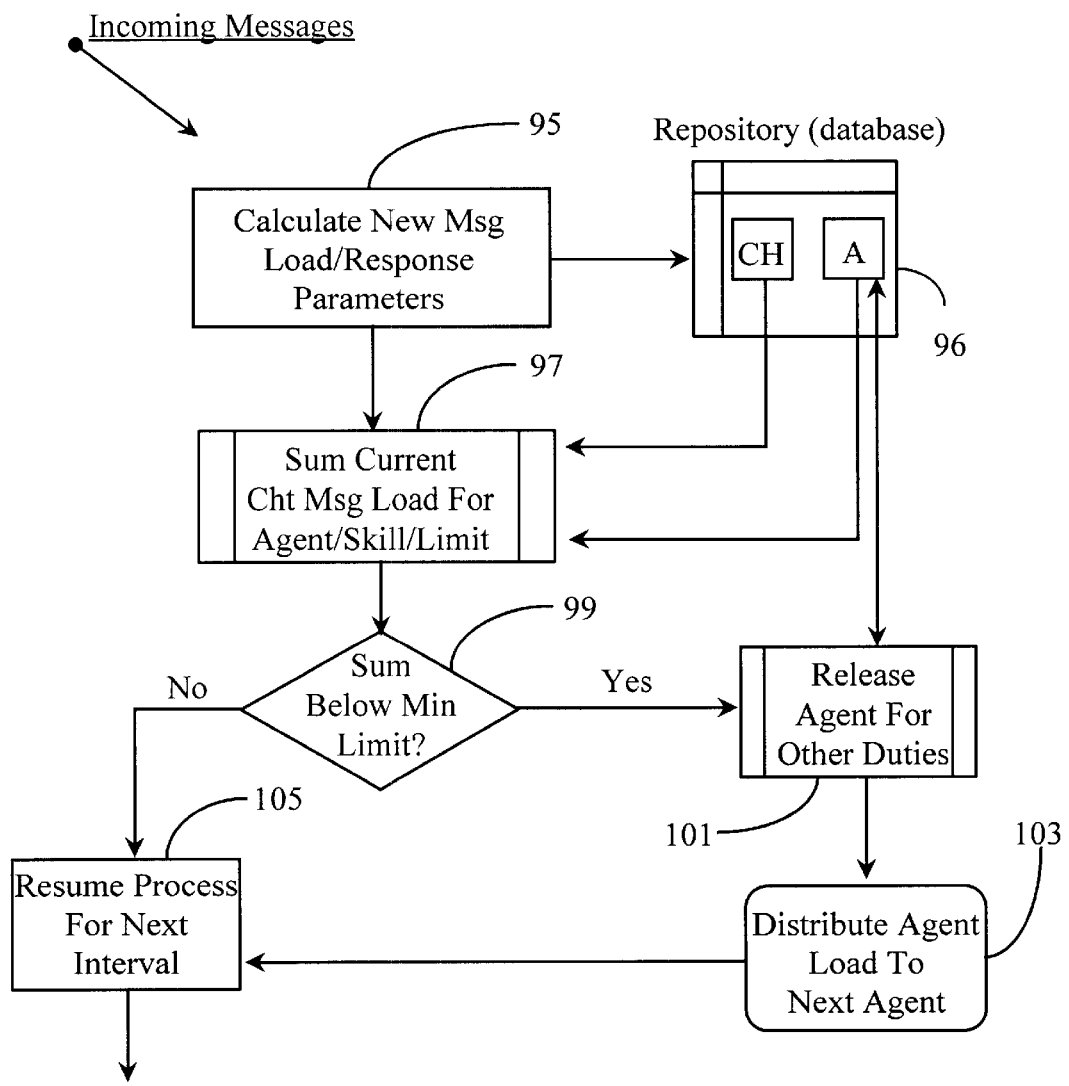
FIG. 3 is a process flowchart illustrating various automated steps associated with an exemplary automated chat-management routine configured to a minimum load limit according to an embodiment of the present invention.

FIG. 3 is a process flowchart illustrating automated steps associated with an exemplary automated chat-management routine configured to a minimum load limit according to an embodiment of the present invention. The process flow represented in this example is the same as for the example of FIG. 2 except that it is configured to a minimum agent load limit instead of a maximum load limit. In actual practice, it is the same routine of FIG. 2 with steps 99, 101, and 103 describing action taken according to "below limit" conditions.

At step 95, incoming messages are monitored for load/response parameters as was described in step 85 of FIG. 2. Monitored data is loaded into a CH database illustrated by the directional arrow between process 95 and the illustrated repository 96.

At step 97, the stored parameters from CH database along with data from A (agent) database are accessed for the purpose of calculating the total message load for that agent. In step 99, it is determined whether or not the total limit falls below a minimum load-limit set for the agent. If it does not, then step 105 causes resumption of the processes described in steps 95 and 97. However, if it is determined at step 99 that the total calculated load falls below the agent's minimum limit, then the agent in question is released for other duties in step 101.

Release of the agent may be effected by notification sent to the agent by such as IPRTR 43 of FIG. 1. This may be such as a screen pop-up, or other convenient method. At step 103, the agent's load (all running sessions) are distributed to other agents with matching skill-sets. In actual practice, the agent or agents assuming the released agent's load are notified which sessions to navigate to and assume control of Such notification may be of the form of a screen notification to the agents appearing on their VDU's. It is noted here that IPRTR 43 has access to all of the recent statistics regarding all agent activity within center 15, including those who are not assigned to chat duty. At step 105, the process resumes at a next monitoring interval for agents and their sessions that are still active.

It will be apparent to one with skill in the art that the processes illustrated by FIGS. 2 and 3 may in practice be combined, and managed by one software 45, and CMS of the present invention may be used in conjunction with any IPNT-capable communication center wherein chat sessions are conducted and hosted by agents without departing from the spirit and scope of the present invention. For example, CMS may be practiced in a dual-capable center as well as an IPNT center.

In one embodiment, CMS software can be implemented on a shared data network wherein agents host sessions in network servers from home computers having network connection capability. Agents who log-on to the network are assigned initial chat sessions held in network servers. Re-assignment and balancing of agents to sessions commences through monitoring and calculating agent loads as described in FIGS. 2 and 3. A main server and repository connected to the network may be adapted to host the CMS routines and to store associated agent's parameters.

In this embodiment, agents who are released from duty may be automatically logged off of the network. If new agents are needed to handle network loads, then agents may be contacted at home by the network and asked if they could log-on and work. A system such as this may pay agents according to skill-set and hours spent hosting sessions. Lesser skilled agents would be the first to be logged off during slow periods. There are many possibilities.

It will be apparent to the skilled artisan that there are many alterations that may be made in embodiments described without departing from the spirit and scope of the present invention. One is, as declared above, that chat sessions are but one example of agent-led communication sessions to which the present invention may be applied. Therefore the present invention should be afforded the broadest scope. The methods and apparatus of the present invention are limited only by the claims that follow.

What is claimed is:

1. In a communication center system wherein agents participate in and host chat room communication sessions on the Internet, a chat room session management system, comprising:

a data repository storing parameters regarding individual sessions in progress in the communication center system and agent parameters including one or both of minimum and maximum load capabilities for individual agents; and a management software executing on a server associated with the communication center system;

characterized in that the management software calculates agent load level over sessions hosted by an individual agent, compares the calculated load level with one or both of minimum and maximum load for said agent, and adjusts agent loading or wait time accordingly.

2. The system of claim 1 wherein the session management system, upon determining a first agent's load level is above maximum, increases wait time or assigns one or more sessions hosted by the first agent to a second agent, or both, reducing the first agent's load.

3. The system of claim 1 wherein the session management system, upon determining a first agent's load level is below minimum, assigns one or more addition sessions to the first agent.

4. The system of claim 1 wherein the session management system operates in a call center having multiple agents interconnected on a communication network.

5. The system of claim 1 wherein the management software determines agent loading by both traffic and agent capability level.

6. In a communication center system wherein agents participate in and host chat room communication sessions on the Internet, a method for managing agent load in the sessions, comprising steps of:

(a) storing parameters regarding individual chat room sessions in progress in the communication center system and agent parameters including one or both of minimum and maximum load capabilities for individual agents in a data repository;

(b) calculating agent load level by a management software;

(c) comparing calculated agent load level with stored minimum and/or maximum allowed agent load level; and (d) adjusting agent assignment to sessions according to the comparison in step (c).

7. The method of claim 6 wherein the session management system, upon determining a first agent's load level is above maximum, assigns one or more sessions hosted by the agent to a second agent, reducing the first agent's load.

8. The system of claim 6 wherein the session management system, upon determining a first agent's load level is below minimum, assigns one or more additional sessions to the first agent.

9. The method of claim 6 wherein the session management system operates in a call center having multiple agents interconnected on a local area network (LAN).

10. The method of claim 6 wherein the management software determines agent loading by both traffic and agent capability level.

11. An Internet-capable communication center comprising:

multiple agent stations having individual chat room session-capable computer stations interconnected on a local area network (LAN); and a server connected on the LAN and executing a management software;

characterized in that the management software calculates agent load-level and manages agent assignment to chat room sessions based on the calculated load level.

12. The communication center of claim 11 wherein individual agents are assigned a maximum load level, and the management software, upon determining a first agent's load level is above maximum, assigns one or more sessions hosted by the first agent to a second agent, reducing the first agent's load level.

13. The communication center of claim 11 wherein individual agents are assigned a minimum load level, and the management software, upon determining a first agent's load level is below minimum, assigns one or more additional sessions to the first agent.

14. The communication center of claim 11 wherein the management software determines agent loading by both traffic and agent capability level.

* * * * *